Patented Aug. 24, 1948

UNITED STATES PATENT OFFICE 2,447,823

PRODUCTION OF N-SUBSTITUTED FURFURYLAMINES

Everet F. Smith, Terre Haute, Ind., assignor to Commercial Solvents Corporation, Terre Haute, Ind., a corporation of Maryland No Drawing. Application February 9, 1946, Serial No. 646,723

6 Claims. (Cl. 260—345)

This invention relates to a process for preparing secondary amines by catalytically reacting a primary amine, a ketone, and hydrogen. More particularly, the invention relates to a process for preparing N-substituted furfurylamines by reacting monofurfurylamine with an aliphatic ketone and hydrogen in the presence of a metal chromite catalyst. In one specific embodiment the invention comprises reacting tetrahydrofurfurylamine with acetone and hydrogen in the presence of copper chromite catalyst to produce N-isopropyltetrahydrofurfurylamine.

The formation of secondary amines from primary amines, ketones, and hydrogen is a chain reaction that takes place in three steps: (1) Condensation of the ketone with the amine to form an unstable intermediate, (2) dehydration of the intermediate compound to form a Schiff base, and (3) hydrogenation of the Schiff base to the desired amine. In carrying out this series of reactions, however, one or more competing reactions are commonly encountered. Certain catalysts, such as Raney nickel, for example, tend to favor the direct hydrogenation of the ketone to the corresponding alcohol, and thus to give low yields, based on the ketone. Certain other catalysts, such as palladium, tend to favor another chain reaction, in which the ketone condenses with itself to form a keto alcohol, the keto alcohol dehydrates to an unsaturated ketone, and the unsaturated ketone is partially hydrogenated to a saturated ketone having twice as many carbon atoms as the original ketone. My invention rests in the discovery that metal chromite catalysts, particularly copper chromite, selectively catalyze the conversion of monofurfurylamines, ketones, and hydrogen to secondary amines.

The amine used in my process may be any primary amine of the type $RNH_2$ in which R is the furfuryl group or a derivative thereof. As examples of such amines may be cited furfurylamine and tetrahydrofurfurylamine.

The ketone used in my process may be alicyclic, such as cyclohexanone; or it may be aralkyl, such as acetophenone; but it is preferably an alkyl ketone, such as acetone, ethyl methyl ketone, diethyl ketone, isobutyl methyl ketone, or amyl methyl ketone.

By a suitable choice of primary amine and ketone, it is possible to produce secondary amines having a wide range of structure, and a wide range of physical properties.

Hydrogen of a relatively high degree of purity is preferred for use in my process. It need not be absolutely pure, but reactive impurities such as oxygen should be kept as low as possible, and catalyst poisons, such as hydrogen sulfide, should be excluded altogether. Inert impurities such as nitrogen are undesirable because they increase the total pressure in the reaction vessel necessary to maintain the required partial pressure of hydrogen. For this reason, the proportion of inert impurities should be kept as low as possible.

A metal chromite catalyst suitable for use in my process may be produced according to the method of Calingaert and Edgar (Ind. Eng. Chem., 26, 878-880 (1934)). This method comprises generally reacting a copper salt, such as the sulfate, with the dichromate of an alkali metal such as sodium, and ammonia, to form a precipitate of copper ammonium chromate, which is then washed, dried, and roasted to produce copper chromite suitable for use in my process. Other known methods may be used for producing chromite catalysts satisfactory for use in my process, the procedure of Calingaert and Edgar being cited merely as a convenient and desirable method.

The inclusion of various additives in the reaction mixture, as recommended in the prior art, has given generally poor results in my process. Calcium oxide, for example, which is reported to act as a stabilizer for copper chromite, tends to increase the hydrogenation of the ketone to the corresponding alcohol. Moreover, alkali-metal salts of weak organic acids, such as sodium acetate, which are reported to increase the conversion in one process for making secondary amines, have shown the opposite effect in my process.

In the reaction of primary amines with ketones to form secondary amines as the ultimate product, the stoichiometric molar ratio is 1 : 1, but the process is operative to some degree over a wide range of reactant ratios, with either the primary amine or the ketone in excess. However, since any excess ketone is ordinarily hydrogenated to the corresponding alcohol, and since under any circumstances there is a tendency toward hydrogenation of a substantial proportion of the ketone, the use of an excess of the primary amine is preferred in order to hold the loss of ketone to a minimum. For best conversions and yields, an excess of approximately 5 to 20% of the primary amine has been found preferable.

The temperatures employed are preferably of the order of 100 to 150° C., but may extend over a range of about 75 to 225° C. At temperatures above 225° C., destructive reactions begin to take place, and the hydrogenation is less selective. At temperatures approaching 75° C., the reaction becomes comparatively slow, and substantially higher pressures are required to make the reaction proceed at a practical rate.

Pressures up to 5000 pounds per square inch or more may be employed, but are preferably within the range of 250 to 2000 pounds per square inch. As indicated above, the higher temperatures permit the use of lower pressures, while at the lower temperatures, the hydrogen pressure must be increased in order to maintain a satisfactory hydogenation rate. For any particular combination of primary amine and ketone, however, I have found that the maximum conversion and yield are obtained within a comparatively narrow and specific temperature range and within a comparatively narrow and specific pressure range. For example, in the production of N-isopropyltetrahydrofurfurylamine from tetrahydrofurfurylamine and acetone, the maximum conversion and yield are obtained at about 150° C. and 1000 pounds per square inch.

In carrying out my process, a mixture of the reactants and catalyst may be introduced into a pressure vessel equipped with a suitable stirrer and a jacket or coil for maintaining the charge at the proper temperature. Hydrogen is then injected to the desired pressure, and the autoclave is heated to the desired reaction temperature. During the reaction, hydrogen is added either intermittently or continuously as required to maintain the pressure at the desired level. When the hydrogenation has been completed, as evidenced by the cessation of hydrogen absorption, the reaction mixture is cooled, the autoclave is vented, the contents are discharged, and the product is isolated in a known manner.

Alternatively, I may carry out my process by passing a slurry of the powdered catalyst in the liquid reaction mixture through a column in contact with hydrogen gas under proper conditions of temperature and pressure. Or I may pass the reaction mixture through a stationary bed of pelleted or supported chromite catalyst, enclosed in a reaction vessel of suitable design.

For use in the production of secondary amines, copper chromite possesses numerous advantages over other hydrogenation catalysts:

1. Copper chromite is cheaper than nickel, platinum and palladium catalysts.
2. Copper chromite is easily and conveniently prepared in a semicontinuous unit.
3. Copper chromite is non-pyrophoric, and hence is safer than many catalysts to make and to handle.
4. Unlike nickel, platinum, and palladium, copper chromite is resistant to poisoning.
5. Unlike poison-resistant sulfide-type catalysts, copper chromite is active at comparatively low temperatures and pressures.
6. Copper chromite not only has a long life, but maintains its initial activity longer than do other catalysts.
7. In the presence of copper chromite, the hydrogenation of Schiff bases proceeds at a substantially faster rate than the hydrogenation of ketones. Nickel catalysts tend to produce the opposite effect.
8. According to the prior art, nickel produces tertiary amines from primary amines, ketones, and hydrogen. Copper chromite does not.
9. Palladium catalysts produce a substantial conversion of ketones to higher-boiling ketones in the presence of alkaline materials such as primary amines. Copper chromite does not.

The following example is given to illustrate my invention, and is not to be construed as limiting it to the exact reactants or conditions described:

A mixture of 184 g. acetone, 352 g. tetrahydrofurfurylamine, and 10.7 g. copper chromite was introduced into a stainless-steel rocking bomb having a total volume of 1840 ml., and the bomb was sealed and transferred to a rocking unit oscillating at the rate of 37 cycles per minute. Hydrogen was injected to a pressure of 1000 pounds per square inch, gage, and the bomb was rocked and heated to a temperature of 150° C. The pressure reached a maximum of 1325 pounds per square inch prior to the initiation of the hydrogenation; and as the hydrogenation proceeded, fresh hydrogen was introduced from time to time to restore the pressure to its initial level of 1000 pounds per square inch. A total pressure drop of 1400 pounds per square inch took place in 1.0 hour, at the end of which time the hydrogenation was complete. The bomb was then cooled and emptied, and the product was filtered to remove the catalyst and subsequently fractionally distilled through a laboratory column packed with single-turn glass helices. The following materials were separated: 53 g. tetrahydrofurfurylamine and 326 g. N-isopropyl-tetrahydrofurfurylamine, boiling point (uncorr.) 56–57° C. at 10 mm.

Conversion:

| | Per cent |
|---|---|
| On ketone | 72 |
| On amine | 65 |

Yield:

| | |
|---|---|
| On ketone | 72 |
| On amine | 77 |

I claim as my invention:

1. A process for producing secondary amines which comprises reacting a monofurfurylamine with a ketone and hydrogen in the presence of a metal chromite hydrogenation catalyst.

2. A process for producing secondary amines which comprises reacting a primary amine chosen from the group consisting of furfurylamine and tetrahydrofurfurylamine with a ketone and hydrogen in the presence of a metal chromite hydrogenation catalyst.

3. A process for producing secondary amines which comprises reacting a primary amine chosen from the group consisting of furfurylamine and tetrahydrofurfurylamine with an alkyl ketone and hydrogen in the presence of a copper chromite catalyst.

4. A process for producing N-isopropyltetrahydrofurfurylamine which comprises reacting tetrahydrofurfurylamine with acetone and hydrogen in the presence of a copper chromite catalyst.

5. A process for producing secondary amines which comprises reacting a primary amine chosen from the group consisting of furfurylamine and tetrahydrofurfurylamine with an alkyl ketone and hydrogen at a temperature between about 75 and 225° C. and at a pressure between about 250 and 5000 pounds per square inch in the presence of a copper chromite catalyst.

6. A process for producing N-isopropyltetrahydrofurfurylamine which comprises reacting tetrahydrofurfurylamine, acetone, and hydrogen at a temperature of about 130–150° C., and a pressure of about 250–2000 pounds per square inch in the presence of a copper chromite catalyst.

EVERET F. SMITH.

REFERENCES CITED

The following references are of record in the file of this patent:

UNITED STATES PATENTS

| Number | Name | Date |
|---|---|---|
| 2,137,407 | Lazier | Nov. 22, 1938 |
| 2,175,585 | Adkins | Oct. 10, 1939 |
| 2,217,630 | Winans | Oct. 8, 1940 |

Certificate of Correction

Patent No. 2,447,823.  August 24, 1948.

EVERET F. SMITH

It is hereby certified that error appears in the printed specification of the above numbered patent requiring correction as follows: Column 4, line 59, claim 6, for "130–150° C." read *100–150° C.*; and that the said Letters Patent should be read with this correction therein that the same may conform to the record of the case in the Patent Office.

Signed and sealed this 30th day of November, A. D. 1948.

[SEAL]

THOMAS F. MURPHY,
*Assistant Commissioner of Patents.*